(No Model.)
L. P. VALIQUET.
LADY'S BICYCLE.
No. 308,862. Patented Dec. 2, 1884.
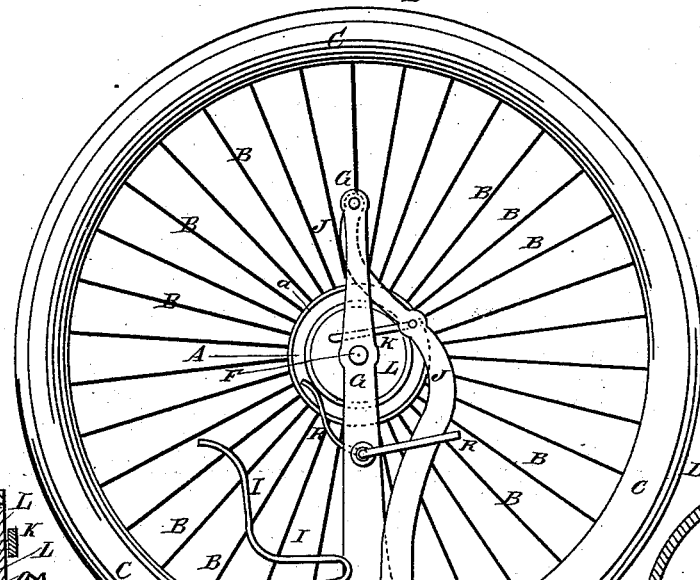
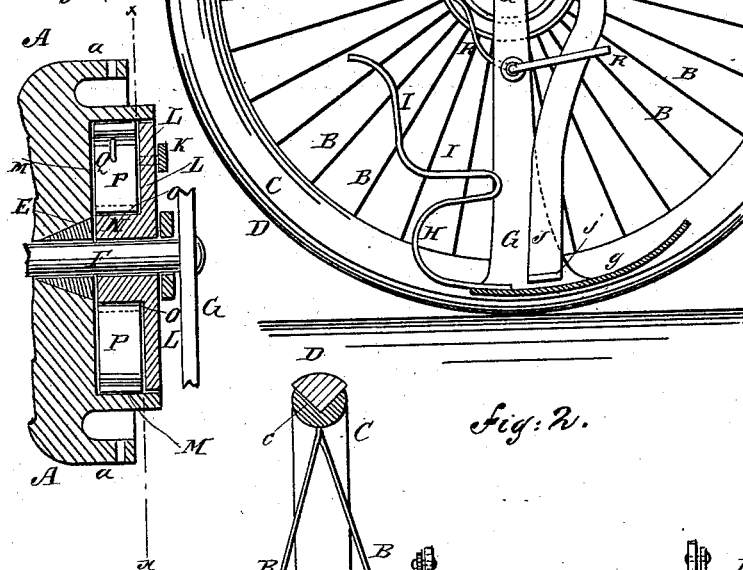
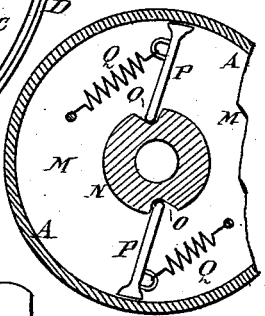
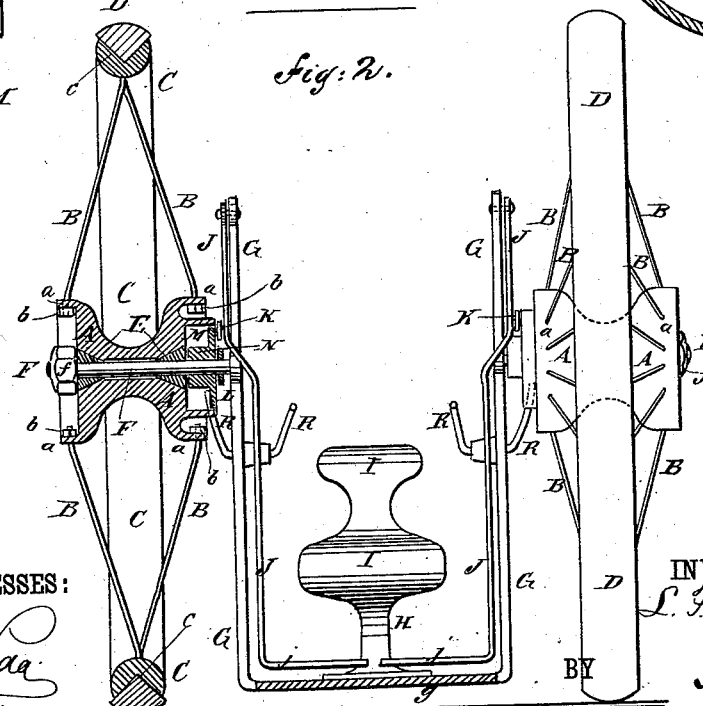
WITNESSES:
Chas. Nida
C. Sedgwick
INVENTOR:
L. P. Valiquet
BY
Munn & Co
ATTORNEYS.

UNITED STATES PATENT OFFICE.

LOUIS P. VALIQUET, OF NEW YORK, N. Y., ASSIGNOR OF ONE-THIRD TO DOUGALD A. McCALL, OF WILLIAMSPORT, PENNSYLVANIA.

LADY'S BICYCLE.

SPECIFICATION forming part of Letters Patent No. 308,862, dated December 2, 1884.

Application filed April 21, 1884. (No model.)

*To all whom it may concern:*

Be it known that I, LOUIS P. VALIQUET, of the city, county, and State of New York, have invented a new and useful Improvement in Ladies' Bicycles, of which the following is a full, clear, and exact description.

Reference is to be had to the accompanying drawings, forming a part of this specification, in which similar letters of reference indicate corresponding parts in all the figures.

Figure 1 is a sectional side elevation of my improvement. Fig. 2 is a front elevation of the same, partly in section. Fig. 3 is a sectional front elevation of one of the friction-clutches enlarged. Fig. 4 is a sectional side elevation of the same, taken through the line $x$ $x$, Fig. 3.

The object of this invention is to provide bicycles constructed in such a manner that they can be conveniently used by ladies.

A further object of this invention is to promote efficiency in the application of power to bicycles.

The invention consists in a bicycle constructed with a frame suspended from and below the axles, to adapt the said bicycle to ladies' use.

The inner ends of the drive-wheel hubs are recessed to receive disks and their hubs, which hubs are recessed to receive the inner ends of pawls, the outer ends of which are held against the concave walls of the recesses by springs, and the said disks and pawls are moved to cause the pawls to clutch the drive-wheel hubs by foot-levers connected with the said disks by rods and fulcrumed to the suspended frame. To the suspended frame are pivoted crank-levers to rest against the hubs of the drive-wheels, and serve as brakes to check the motion of the said drive-wheels, all as hereinafter fully described, and pointed out in the claims.

A are the wheel-hubs, which are made thin in the middle and thicker at the ends, which ends are recessed to form flanges $a$, to receive the inner ends of the staggered spokes B, where they are secured in place by nuts $b$, so that the wear can be taken up by tightening the said nuts $b$. The outer ends of the spokes B are screwed into the rims C, or are secured to the said rims by riveting or by other suitable means.

In the treads of the rims C are formed V-shaped grooves $c$, to receive rubber tires D, to prevent the wheels from slipping and from making a noise. The ends of the bores of the hubs A are made conical, and are fitted to conical bushes E placed upon the axles F, and secured to the said axles by keys or other suitable means, that will prevent the said bushes from turning upon the said axles. The hubs A are kept in place upon the axles F by nuts $f$, screwed upon the outer ends of the said axles.

To the inner ends of the axles F are attached the arms of a U-shaped bar, G, the ends of which project above the said axles, and which forms the frame of the bicycle.

To the middle part of the U-bar G is attached the standard H of the rider's seat I. The middle part, $g$, of the U-bar frame G is extended forward, or has an extension, $g$, attached to it, to form a platform for the rider's feet.

To the outer sides of the ends of the U-bar G are pivoted the upper ends of the foot-levers J, which are bent forward, inward, backward, and downward, so as to pass to the inner sides of the arms of the bar G, and which extend nearly to the platform $g$, where they are bent inward to form foot-rests $j$, or have inwardly-projecting foot-rests $j$ attached to them, so that the rider while sitting upon the seat I can readily operate the said levers J with her feet.

To the upper parts of the foot-levers J, a little above the level of the axles F, are pivoted the forward ends of two connecting-rods, K, the rear ends of which are pivoted to disks L, fitted into the mouths of the cylindrical recesses M, formed in the inner ends of the hubs A.

Upon the middle parts of the inner sides of the disks L are formed, or to them are rigidly attached, cylindrical hubs N, which fit and rock upon the axles F.

In the opposite sides of the hubs N are formed recesses O, in which rest the inner ends of the pawls P. The outer ends of the pawls P rest against the concave surfaces of the walls of the recess M, and are held against the said surfaces by spiral or other springs Q, connected at one end with the said pawls, and at their other ends with the ends of the hubs A. The pawls P are made of such a length that they can never come into a radial position, and will thus be made to clutch the hub A, when the disks L and hubs N are turned in such a direction as will tend to carry the inner ends of the said pawls into radial lines in connection with their outer ends. With this construction, when a rider, sitting upon the seat I, pushes the lower ends of the levers J forward with her feet, the connecting-rods K draw the upper parts of the disks L forward, turning the disks L and hubs N forward, and causing the pawls P to clutch the hubs A and turn the wheels A B C forward. When the forward pressure upon the levers J is relaxed, the levers J, disks and hubs L N, and pawls P return to their former position, ready to be again operated, while the wheels A B C continue to move forward with the impulse given them, so that very great speed can be readily given to the bicycle.

To the frame-bars G, a little below the hubs A, are pivoted crank-levers R, the inner arms of which project into such positions that they can be readily reached and operated by the rider with her hands. The outer arms of the crank-levers R project into such positions that a slight movement of the said levers will bring the said outer arms against the outer surface of the inner ends of the hubs A, and serve as brakes to check the revolutions of the wheels A B C.

By operating the brake-levers R separately to check the motion of the right or left wheel A B C, the bicycle will be caused to turn toward the right or left, so that the brake-levers can be used for guiding the bicycle.

Having thus described my invention, I claim as new and desire to secure by Letters Patent—

1. In a bicycle, the combination, with the drive-wheels and a clutching mechanism arranged in the hubs of said wheels, of the frame G, suspended from the axle, with its ends projecting above the same, the foot-levers J, pivoted to the upper ends of said frame, and the rods K, connecting the foot-levers to the clutching mechanism, substantially as herein shown and described.

2. In a bicycle, the combination, with the recessed hub A and the axle F, of the disk L, provided with the hub N, having recesses O, the pawls P, having their inner ends resting in said recesses, and the springs Q, connected to said pawls and hub, substantially as herein shown and described.

3. In a bicycle, the combination, with the recessed hub A, the axle F, the disk and recessed hub L N, the pawls and springs P Q, and the frame G, of the connecting-rod K and the foot-lever J, substantially as herein shown and described, whereby the said disk and pawls will be operated to give motion to the wheels, as set forth.

4. In a bicycle, the combination, with the hubs A and the suspended frame G, of the crank-levers R, substantially as herein shown and described, whereby the motion of the wheels can be checked, as set forth.

LOUIS P. VALIQUET.

Witnesses:
A. G. WRIGHT,
ALVENO J. ADAMS.